United States Patent
Hirai et al.

(10) Patent No.: US 7,622,167 B2
(45) Date of Patent: Nov. 24, 2009

(54) POLARIZER, METHOD FOR MANUFACTURING THE SAME, OPTICAL FILM AND IMAGE DISPLAY

(75) Inventors: Mariko Hirai, Ibaraki (JP); Takashi Kamijo, Ibaraki (JP); Minoru Miyatake, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 451 days.

(21) Appl. No.: 10/532,059

(22) PCT Filed: Oct. 20, 2003

(86) PCT No.: PCT/JP03/13349

§ 371 (c)(1),
(2), (4) Date: Apr. 21, 2005

(87) PCT Pub. No.: WO2004/038463

PCT Pub. Date: May 6, 2004

(65) Prior Publication Data

US 2006/0050187 A1 Mar. 9, 2006

(30) Foreign Application Priority Data

| Oct. 25, 2002 | (JP) | 2002-310686 |
| Oct. 25, 2002 | (JP) | 2002-310697 |
| Dec. 19, 2002 | (JP) | 2002-367768 |

(51) Int. Cl.
G02F 1/1335 (2006.01)

(52) U.S. Cl. .......................... 428/1.31; 349/96; 359/492

(58) Field of Classification Search ............... 428/1.3, 428/323, 328, 332–333, 402, 1.31; 349/96; 359/492

See application file for complete search history.

(56) References Cited

U.S. PATENT DOCUMENTS

| 2,246,087 A | * | 6/1941 | Bailey et. al. | ............... 359/492 |
| 2,454,515 A | * | 11/1948 | Land | ........................... 359/491 |
| 3,281,344 A | * | 10/1966 | Thomas | ..................... 523/300 |
| 3,350,982 A | * | 11/1967 | Marks | ......................... 353/20 |
| 3,813,265 A | * | 5/1974 | Marks | ........................ 427/473 |

(Continued)

FOREIGN PATENT DOCUMENTS

CN    1334470 A    2/2002

(Continued)

OTHER PUBLICATIONS

JPO Website Machine English Translation of JP 08-184701, Ando Shinji et al., Jul. 16, 1996.*

(Continued)

*Primary Examiner*—David R Sample
*Assistant Examiner*—Sophie Hon
(74) *Attorney, Agent, or Firm*—Westerman, Hattori, Daniels & Adrian, LLP (57) ABSTRACT

A polarizer of the present invention is composed of a film comprising a structure in which fine metallic particles is dispersed in a polymer matrix is characterized in that a polymer forming the polymer matrix is a translucent polymer having a transmittance of 88% or more when measured thereof with a thickness of 1 mm and the film is uniaxially stretched. The polarizer is good in heat resistance and transmittivity.

22 Claims, 1 Drawing Sheet

U.S. PATENT DOCUMENTS

| | | | |
|---|---|---|---|
| 4,049,338 A * | 9/1977 | Slocum | 359/352 |
| 4,268,127 A * | 5/1981 | Oshima et al. | 349/96 |
| 4,663,083 A * | 5/1987 | Marks | 252/583 |
| 4,763,133 A * | 8/1988 | Takemura et al. | 343/912 |
| 5,179,993 A * | 1/1993 | Bak et al. | 164/46 |
| 5,184,233 A * | 2/1993 | Lim et al. | 349/166 |
| 5,489,496 A * | 2/1996 | Katayama et al. | 430/62 |
| 5,550,661 A | 8/1996 | Clark et al. | |
| 6,088,067 A | 7/2000 | Willett et al. | |
| 6,522,446 B2 * | 2/2003 | Saxe | 359/237 |
| 6,696,113 B2 * | 2/2004 | Kawata et al. | 428/1.1 |
| 6,833,166 B2 * | 12/2004 | Hikmet | 428/1.1 |
| 2002/0005919 A1 | 1/2002 | Babrov | |
| 2002/0186469 A1 * | 12/2002 | Kawazu et al. | 359/486 |
| 2003/0071940 A1 | 4/2003 | Babrov | |
| 2006/0215080 A1 | 9/2006 | Babrov | |

FOREIGN PATENT DOCUMENTS

| | | |
|---|---|---|
| JP | 63-103209 A | 5/1988 |
| JP | 1-11711 A | 1/1994 |
| JP | 8-184701 | 7/1996 |
| JP | 2001-296427 | 10/2001 |
| JP | 2002-22966 A | 1/2002 |
| JP | 2002-267842 | 9/2002 |
| TW | 430746 B | 4/2001 |
| TW | 468351 B | 12/2001 |

OTHER PUBLICATIONS

Office Action of Corresponding Chinese Patent Application No. 200380100974.7 issued Sep. 8, 2006.

Supplemental European Search Report of Corresponding European Patent Application No. 03754177.8 dated Jul. 20, 2007.

* cited by examiner

Fig 1

POLARIZER, METHOD FOR MANUFACTURING THE SAME, OPTICAL FILM AND IMAGE DISPLAY

TECHNICAL FIELD

This invention relates to a polarizer and a fabrication method therefor. The invention further relates to a polarizing plate and an optical film comprising the polarizer. The invention still further relates to an image display such as a liquid crystal display, an organic EL display or PDP comprising the polarizer, the polarizing plate or the optical film.

BACKGROUND ART

An image display such as a liquid crystal display employs a polarizer (polarizing plate) according to the underlying principle of the displays. In company with progress to a large-sized image display or a diversification of functionality thereof in recent years, the demand for polarizers have been on the rise and at the same time, requirements for better quality and improved durability have been more and more increasing. Especially, very high heat resistance has been required in applications to the liquid crystal displays, which are assumed to be used in a severe environment outdoors, used in a cellular phone, a PDA and the like; and to the liquid crystal displays used in a vehicle navigation and a liquid crystal projector.

Conventionally, as a polarizer for an image display, there has been widely employed mainly a polarizer fabricated by dyeing a stretched polyvinyl alcohol film with a dichroic material such as iodine or a dye, which has the property of dichroism (see, for example, JP-A No. 2001-296427).

An iodine-based polarizer is obtained in a procedure in which a film is dyed with an aqueous solution containing amorphous iodine, followed by stretching, has a high polarizability for visible light and can be fabricated as a large-sized polarizer. However, in the iodine-based polarizer iodine sublimes at a high temperature or its complex structure is altered, which makes it difficult to maintain a polarization performance. On the other hand, a dye-based polarizer using a dichroic dye is better in heat resistance as compared with the iodine-based polarizer, whereas the polarizer has not been widely employed with limited applications thereof because of insufficient dichroic ratio of a dye used therein and poor weather resistance thereof. Note that in addition to polyvinyl alcohols, examples of film materials of a polarizer include: polystyrenes, cellulose derivatives, polyvinyl chlorides, polypropylenes, acrylic-based polymers, polyamides, polyesters, saponified products of ethylene-vinyl acetate copolymers and others.

A polarizer fabricated by dispersing metallic particles having anisotropy in light absorption property on an isotropic substrate is adopted as a polarizer used in the field of optical devices such as an optical communication device and an optical recording reproduction device requiring a heat resistance at a high temperature. As such a polarizer, there has been adopted, for example, a polarizer fabricated in a procedure in which metal particles are deposited in glass through a reduction reaction or the like, followed by stretching. A polarizer obtained by dispersing fine metallic particles on an isotropic substrate is not suited for mass production because fine metallic particles are deposited with a vacuum deposition method or the like, which requires a high temperature heating process.

It has been known that a film in which fine metallic particles having anisotropy are dispersed in polyimide are uniaxially stretched to thereby obtain a polarization film good in heat resistance (see, for example, JP-A No. 8-184701). Since such a polarizing film is, however, made form polyimide, the film has a problem of yellowing even after uniaxially stretching and poor in transmittivity.

A polarizer using a dichroic material described above to which iodine belongs exerts a polarization performance by aligning the dichroic material along a stretch direction. Absorption spectra measured when polarized light enters on such a polarizer generally include an absorption spectrum (MD spectrum) with an incident polarization plane in parallel to a stretch direction of the polarizer and an absorption spectrum (TD spectrum) with an incident polarization plane in parallel to a direction perpendicular to the stretch direction of the polarizer, wherein both have the same spectral line shape as each other (almost the same absorption peak wavelength) and a relation in absorbance of MD spectrum>TD spectrum. That is, "the absorption peak of an absorption spectrum shifts longitudinally" depending on an azimuth of the incident polarization plane relative to a polarizer. In order to enhance a polarization performance, it is required that an absorbance at the absorption peak in the MD spectrum is increased, while an absorbance at the absorption peak in the TD spectrum is decreased to the lowest possible value. That is, it has been necessary to increase a difference in absorbance between the MD spectrum and the TD spectrum to the maximum possible value.

DISCLOSURE OF INVENTION

It is an object of the invention to provide a polarizer capable of being fabricated with a simple and ease method, and good in heat resistance, and a fabrication method therefor.

It is another object of the invention to provide a polarizer good in heat resistance and transmittivity, and a fabrication method therefor.

It is still another object of the invention to provide a polarizer good in polarization performance in a case where a difference in absorbance between the MD spectrum and TD spectrum is small.

It is further another object of the invention to provide a polarizing plate comprising the polarizer and to provide an optical film comprising the polarizer, or the polarizing plate. It is a further object of the invention to provide an image display comprising the polarizer, the polarizing plate or the optical film.

The inventors, in order to solve the problems, have conducted serious studies with the following findings that the objects can be achieved with a polarizer shown below, which has led to completion of the invention.

The invention (1) is related to a polarizer composed of a film comprising a structure in which fine metallic particles is dispersed in a polymer matrix, wherein a polymer forming the polymer matrix is a translucent polymer having a transmittance of 88% or more when measured thereof with a thickness of 1 mm and the film is uniaxially stretched.

Since the polarizer of the invention has a structure in which fine a metallic particle is dispersed in a polymer matrix, the polarizer has a heat resistance when used as an image display and is preferably adopted in applications requiring a heat resistance. A translucent polymer having a transmittance of 88% or more is used in the polymer matrix, which renders a transmittivity of the matrix good. The higher the transmittance of a translucent polymer is, the more the polymer is preferred and the transmittance is preferably 88% or more and more preferably 90% or more. The transmittance of a translucent polymer is a total light transmittance when measured on a film formed therewith to a thickness of 1 mm with UV-3150 manufactured by SHIMADZU CORPRATION.

It is estimated that fine metallic particles dispersed in a polymer matrix causes a surface plasmon absorption to thereby absorb light of a certain wavelength, and it is further thought that since a translucent polymer, which is a medium, has uniaxial birefringence due to uniaxial stretching, the stretched polymer exerts an optical anisotropy and thereby, a polarizer of the invention reveals a polarization characteristic. A plasmon absorption is caused by resonance between an oscillation of incident light at an interface of a fine particle and a plasma oscillation of electrons in the fine particle, in which situation the metal exhibits a large light absorption characteristic. Since a wavelength region having a polarization characteristic is determined by a plasmon absorption wavelength of fine metallic particles and a refractive index of a translucent polymer, which is a medium, a polarizer with any optical characteristic can be designed by using a birefringence of the translucent polymer. While iodine or a dichroic dye is usually used as an absorption material, a metal is, in the invention, used as an absorption material using a characteristic of fine metallic particles.

In the polarizer, a domain formed with fine metallic particles preferably has an average particle diameter of 100 nm or less, and an aspect ratio (a ratio of the maximum length/the minimum length) of 2 or less. That is, the domain is preferably a near sphere with no anisotropy in shape. This is because if the aspect ratio exceeds 2, major axes of fine metallic particles is necessary to be aligned in an alignment direction when alignment of the fine metallic particles is required, whereas if the aspect ratio is 2 or less, no necessity arises for a step of aligning the particle with respect to a major axis and minor axis. An average particle diameter of the domain is preferably 100 nm or less and more preferably 50 nm or less. The aspect ratio is preferably 2 or less, more preferably 1.8 or less, and further more preferably 1.5 or less. Note that description will be given of details of an average particle diameter of domains and the aspect ratio of fine metallic particles in examples.

The invention is directed to a fabrication method for the polarizer, comprising steps of: forming a film with a mixed solution comprising fine metallic particles obtained by dispersing fine metallic particles in a solution containing a translucent polymer having a transmittance of 88% or more when measured thereof with a thickness of 1 mm and thereafter, uniaxially stretching the film.

A polarizer of the invention is good in heat resistance and transmittance and can be fabricated with a simple and easy method. Since a wavelength region having a polarization characteristic is determined by a plasmon absorption wavelength of fine metallic particles and a characteristic such as a refractive index of a translucent polymer, which is a medium, a polarizer having any optical characteristic can be fabricated by properly selecting a translucent polymer, a material of fine metallic particles and others and further controlling a birefringence of a film made from the translucent polymer with uniaxial stretching.

The invention (2) is related to a polarizer in which fine metallic particles is dispersed in a matrix formed with a liquid crystalline material. The liquid crystalline material of the polarizer is preferably uniaxially aligned.

Since the polarizer of the invention has a structure in which fine metallic particles is dispersed in a matrix, the polarizer has a heat resistance in a case where it is used as an image display and preferably adopted in applications where a heat resistance is required. A polarizer of the invention with such a structure can be fabricated with a simple and easy method. The liquid crystalline material is preferably a liquid crystal polymer since a fabrication method in the case is simple and easy.

It is estimated that fine metallic particles dispersed in a matrix causes a surface plasmon absorption and thereby absorbs light of a certain wavelength, and a liquid crystalline material, which is a medium, exerts an optical anisotropy and it is thought that a polarizer of the invention thereby reveals a polarization characteristic. A Plasmon absorption is caused by resonance between an oscillation of incident light at an interface of a fine particle and a plasma oscillation by electrons in the fine particle, in which situation metal exhibits a large absorption characteristic. Since a wavelength region having a polarization characteristic is determined by a plasmon absorption wavelength of fine metallic particles and characteristics such as a refractive index of a liquid crystalline material, which is a medium, a polarizer with any optical characteristic can be designed by using a birefringence of the liquid crystalline material. While iodine or a dichroic dye is usually employed as an absorption material, a metal is, in the invention, used as an absorption material using a characteristic of fine metallic particles.

In the polarizer, a domain formed with fine metallic particles preferably has an average particle diameter of 100 nm or less, and an aspect ratio (a ratio of the maximum length/the minimum length) of 2 or less. That is, the domain is preferably a near sphere with no anisotropy in shape. This is because if the aspect ratio exceeds 2, major axes of fine metallic particles is necessary to be aligned in an alignment direction when alignment of the fine metallic particles is required, whereas if the aspect ratio is 2 or less, no necessity arises for a step of aligning the particle with respect to a major axis and minor axis. An average particle diameter of the domain is preferably 100 nm or less and more preferably 50 nm or less. The aspect ratio is preferably 2 or less, more preferably 1.8 or less, and further more preferably 1.5 or less. Note that description will be given of details of an average particle diameter of domains and the aspect ratio of fine metallic particles in examples.

The invention is related to a fabrication method for the polarizer, comprising step of: forming a film with a mixed solution obtained by dispersing fine metallic particles in a solution containing a liquid crystalline material.

According to the fabrication method, a polarizer good in heat resistance can be obtained with a simple and easy way. Since a wavelength region having a polarization characteristic is determined by a plasmon absorption wavelength of fine metallic particles and characteristics such as a refractive index of a liquid crystalline material, which is a medium, a polarizer with any optical characteristic can be fabricated by properly selecting a liquid crystalline material, fine metallic particles and others and controlling a birefringence of a film formed with the liquid crystalline material.

The invention (3) is related to a polarizer having an absorption spectrum with an absorption peak at a given wavelength, measured when polarized light impinges thereon,
  wherein if an azimuth of an incident polarization plane is altered relative to the polarizer, the absorption peak wavelength shifts in accordance with an alteration in the azimuth.

In this way, in the polarization absorption spectrum of a polarizer of the invention, a value of the absorption peak wavelength itself alters depending on an azimuth of an incident polarization plane. That is, "an absorption spectrum shifts an absorption peak laterally" depending on an azimuth of the incident polarization plane relative to the polarizer. As a result of the shift, a good polarization performance can be exerted depending on an azimuth of the incident polarization plane even with a small difference in absorbance between the MD spectrum and the TD spectrum. Note that measurement of an absorption spectrum is detailed in the examples.

In the polarizer, generally, in a case where an azimuth of the incident polarization plane relative to the polarizer is altered, if an azimuth of the incident polarization plane is 0 degree when an absorption peak wavelength of an absorption spectrum that is measured is the longest wavelength, which is referred to as λ1, by definition, if an azimuth of the polarization plane is gradually increased from 0 degree, a value of the absorption peak wavelength shifts to the short wavelength side in company with the increase and when an azimuth of the incident polarization plane is 90 degrees, a value of the absorption peak wavelength is the shortest wavelength, which is referred to as λ2, by definition. A polarizer of the invention usually has the absorption peak wavelength in the MD spectrum as the longest wavelength (λ1), and as an azimuth of the incident polarization plane is rotated with the azimuth corresponding the MD spectrum as a reference, the absorption peak wavelength of a polarization spectrum gradually shifts to the short wavelength side and when the rotation reaches 90 degrees (the TD spectrum), the peak wavelength takes the shortest wavelength (λ2) or vice versa.

The polarizer preferably satisfies a relation of (λ1−λ2)=10 to 50 nm and more preferably a relation of (λ1−λ2)=20 to 50 nm. If the value of (λ1−λ2) is less than 10 nm, two absorptions to be shifted are almost superimposed one on the other, which makes it difficult to exert a polarization characteristic.

An absorption characteristic of a polarizer of the invention as described here is clearly different from an absorption characteristic of an iodine-based polarizer or a polarizer using a dichroic dye.

The polarizer of the invention that is used can be a polarizer in which fine metallic particles is dispersed in an organic matrix having a birefringence in the film plane.

It is estimated that fine metallic particles dispersed in the organic matrix cause a surface plasmon absorption and thereby absorbs light of a certain wavelength, so that a polarization characteristic exerted by the polarizer is obtained. A Plasmon absorption is caused by resonance between a oscillation of incident light at an interface of a fine particle and a plasma oscillation by electrons in the fine particle, in which situation metal exhibits a large absorption characteristic. The absorption characteristic is determined by a plasmon absorption wavelength of fine metallic particles and characteristics such as a refractive index of an organic material, which is a medium, and a dispersion state of domains made of fine metallic particles. Hence, in a case where a refractive index is different according to an azimuth in a surface of a film (that is, in a case of a birefringent medium), the absorption characteristic is different according to an azimuth of the incident polarization plane and a shift in wavelength therefore occurs. It is thought that anisotropy in absorption, that is a polarization performance, is revealed according to a principle described above.

Since a polarizer of the invention has a structure in which fine metallic particles is dispersed in a matrix, it has a heat resistance when being used as an image display. Therefore, a polarizer of the invention is preferable in applications, in which very high heat resistance has been required, to liquid crystal displays, which are assumed to be used in a severe environment outdoors, including liquid crystal displays such as a cellular phone and a PDA; and liquid crystal displays such as vehicle navigation and a liquid crystal projector.

The organic matrix is formed with a polymer matrix, a polymer forming the polymer matrix is a translucent polymer having a transmittance of 88% or more when measured thereof with a thickness of 1 mm, and the film is a uniaxially stretched can be preferably used as the film.

An organic matrix that is used is preferably formed with a liquid crystalline material. A liquid crystalline material is preferably uniaxially aligned. A liquid crystalline material is preferably a liquid crystal polymer because of simplicity and ease in fabrication method.

In the polarizer, a domain formed with fine metallic particles preferably has an average particle diameter of 100 nm or less, and an aspect ratio (a ratio of the maximum length/the minimum length) of 2 or less. That is, the domain is preferably a near sphere with no anisotropy in shape. This is because if the aspect ratio exceeds 2, major axes of fine metallic particles is necessary to be aligned in an alignment direction when alignment of fine metallic particles is required, whereas if the aspect ratio is 2 or less, no necessity arises for a step of aligning the particle with respect to a major axis and minor axis. An average particle diameter of the domain is preferably 100 nm or less and more preferably 50 nm or less. The aspect ratio is preferably 2 or less, more preferably 1.8 or less, and further more preferably 1.5 or less. Note that description will be given of details of an average particle diameter of domains and the aspect ratio of fine metallic particles in examples.

Note that an alteration in the absorption peak according to an azimuth of the incident polarization plane of a polarizer of the invention is also controlled by a distribution state of domains formed with fine metallic particles in addition to anisotropy in refractive index of a matrix material.

The invention is related to a polarizing plate in which a transparent protective layer is provided on at least one surface of the polarizer. The invention is further related an optical film comprising at least one polarizer or the polarizing plate as a laminate. The invention is still further related to an image display comprising the polarizer, the polarizing plate or the optical film.

BEST MODE FOR CARRYING OUT OF THE INVENTION

A polarizer of the invention is formed with an organic matrix having a birefringence. Examples of organic matrix materials include: a film obtained by uniaxially stretching a non-liquid crystal polymer (translucent polymer); a film obtained by uniaxially aligning a liquid crystalline material and others.

A translucent polymer that is used preferably has a transmittance of 88% or more when measured on a sample thereof with a thickness of 1 mm. Any of translucent polymers each with a transmittance in the range can be used without placing any specific limitation thereon.

Examples of translucent polymers include: polyvinyl alcohol or a derivative thereof. As derivatives of polyvinyl alcohol, polyvinyl formals, polyvinyl acetals, etc. may be mentioned, and in addition derivatives modified with olefins, such as ethylene and propylene, and unsaturated carboxylic acids, such as acrylic acid, methacrylic acid, and crotonic acid, alkyl esters of unsaturated carboxylic acids, acrylamides etc. may be mentioned. A polymerization degree of polyvinyl alcohol that can be generally used is about 1000 to 10000 and a saponification thereof is about 80 to 100 mol %.

Note that additives such as a plasticizer can also be added into the polyvinyl alcohol-based resin film. Examples of plasticisers include: polyols and condensates thereof such as glycerin, diglycerin, triglycerin, ethylene glycol, propylene glycol, polyethylene glycol and others. No limitation is placed on a content of a plasticizer and the content is preferably 20 wt % or less in the polyvinyl alcohol-based resin film.

Examples of translucent polymers include: polyester-based resins such as polyethylene terephthalate and polyethylene naphthalate; styrene-based resins such as polystyrene and acrylonitrile styrene copolymer (AS resin); and olefin-based resins such as polyethylene, polypropylene, a polyolefin with cyclo or norbornene structure and an ethylene propylene copolymer. Examples further include: a vinyl chloride-based resin, a cellulose-based resin, an acrylic-based resin, an amide-based resin, an imide-based resin, a sulfone-based polymer, a polyether sulfone-based resin, a polyether ether ketone-based resin polymer, a polyphenylene sulfide-based resin, a vinylidene chloride-based resin, a vinyl butyral-based resin, an allylate-based resin, a polyoxymethylene-based resin, a silicone-based resin, a urethane-based resin and others. The translucent polymers can be used either alone or in combination of two kinds or more. A translucent polymer can also be used with a cured product of a thermoset resin or an ultraviolet curing resin such as a phenol-based, a melamine-based, an acrylic-based, a urethane-based, an acrylic urethane-based, an epoxy-based or a silicone-based resin.

A film formed with a translucent polymer is imparted a uniaxial birefringence by in a uniaxial stretch treatment. Therefore, preferable is a translucent polymer having an anisotropy causing a birefringence with ease and preferable examples thereof include polyvinyl alcohol, polycarbonate, a sulfone-based polymer and others.

A liquid crystalline material may be a low molecular weight liquid crystal or a high molecular weight liquid crystal (liquid crystal polymer) or may be an active energy ray curing polymerizable liquid crystal (a liquid crystal monomer). A liquid crystal polymer is aligned, for example, by heating or the like and then cooled and fixed to form a matrix. A liquid crystal monomer is polymerized by irradiation with an energy ray such as ultraviolet after alignment thereof to thereby a matrix.

A liquid crystalline material mentioned above may be a compound exhibiting a liquid crystallinity at a room temperature, a lyotropic liquid crystal, a thermotropic liquid crystal or a compound exhibiting liquid crystallinity at a high temperature. As liquid crystalline materials, preferably used are liquid crystalline materials revealing a nematic phase or a smectic phase. The liquid crystalline materials can be used either alone or in mixture of two or more kinds.

As the above-mentioned liquid crystal polymers, polymers having various skeletons of principal chain types, side chain types, or compounded types thereof may be used without particular limitation. As principal chain type liquid crystal polymers, polymers, such as condensed polymers having structures where mesogen groups including aromatic units etc. are combined, for example, polyester based, polyamide based, polycarbonate based, and polyester imide based polymers, may be mentioned. As the above-mentioned aromatic units used as mesogen groups, phenyl based, biphenyl based, and naphthalene based units may be mentioned, and the aromatic units may have substituents, such as cyano groups, alkyl groups, alkoxy groups, and halogen groups.

As side chain type liquid crystal polymers, polymers having principal chain of, such as polyacrylate based, polymethacrylate based, poly-alpha-halo acrylate based, poly-alpha-halo cyano acrylate based, polyacrylamide based, polysiloxane based, and poly malonate based principal chain as a skeleton, and having mesogen groups including cyclic units etc. in side chains may be mentioned. As the above-mentioned cyclic units used as mesogen groups, biphenyl based, phenyl benzoate based, phenylcyclohexane based, azoxybenzene based, azomethine based, azobenzene based, phenyl pyrimidine based, diphenyl acetylene based, diphenyl benzoate based, bicyclo hexane based, cyclohexylbenzene based, terphenyl based units, etc. may be mentioned. Terminal groups of these cyclic units may have substituents, such as cyano group, alkyl group, alkenyl group, alkoxy group, halogen group, haloalkyl group, haloalkoxy group, and haloalkenyl group. Groups having halogen groups may be used for phenyl groups of mesogen groups.

Besides, any mesogen groups of the liquid crystal polymer may be bonded via a spacer part giving flexibility. As spacer parts, polymethylene chain, polyoxymethylene chain, etc. may be mentioned. A number of repetitions of structural units forming the spacer parts is suitably determined by chemical structure of mesogen parts, and the number of repeating units of polymethylene chain is 0 through 20, preferably 2 through 12, and the number of repeating units of polyoxymethylene chain is 0 through 10, and preferably 1 through 3.

The above-mentioned liquid crystal polymers preferably have glass transition temperatures of 50° C. or more, and more preferably 80° C. or more. Furthermore they have approximately 2,000 through 100,000 of weight average molecular weight.

As liquid crystalline monomers, monomers having polymerizable functional groups, such as acryloyl groups and methacryloyl groups, at terminal groups, and further having mesogen groups and spacer parts including the above-mentioned cyclic units etc. may be mentioned. Crossed-linked structures may be introduced using polymerizable functional groups having two or more acryloyl groups, methacryloyl groups, etc., and durability may also be improved.

No specific limitation is placed on a kind of fine metallic particles dispersed in the matrix to form domains and any of kinds of fine metal particles may be employed as far as each of the kinds has absorption in the visible region. Examples of metals include: silver, copper, gold, platinum, aluminum, palladium, rhodium, iron, chromium, nickel, manganese, tin, cobalt, titanium, magnesium, lithium and others, and alloys of two or more kinds of the metals as elements. The metals as elements and alloys thereof can be used in combination of plural kinds thereof.

A content of fine metallic particles dispersed in a matrix is preferably 0.1 to 10 parts by weight and more preferably 0.5 to 5 parts by weight relative to 100 parts by weight of the matrix materials in order to attain a polarizer good in heat resistance and transmittivity. Domains formed with fine metallic particles in a polymer matrix or a liquid crystalline material are not, as described above, preferably aligned in a specific direction and an average particle diameter of fine metallic particles is preferably 100 nm or less and an aspect ratio thereof is preferably 2 or less.

Fine metallic particles in the initial state can be replaced with a metallic dopant capable of forming fine metallic particles by reduction and deposition or the like. A metallic dopant can deposit fine metallic particles and fine metallic particles can be dispersed in a process in which the metallic dopant is mixed into a solution containing an organic matrix material, followed by reduction or the like. It is only required in order for a metallic dopant to be usable that a metallic dopant can be dissolved in a solution of the organic matrix material and has absorption in the visible light region and examples thereof are as follows: The examples thereof, include: an inorganic metal compound, an organic metal compound and a complex of an inorganic metal compound and an organic metal compound, and a complex of organic metal compounds. The examples thereof, to be more detailed, include: a metal halide, a metal nitrate, a metal acetate, a metal trifluoroacetate, a metal acetylacetonate, a metal trifluoroacetylacetonate, a metal hexafluoroacetylacetonate and others. Further examples thereof that can be used include: complexes obtained by mixing the compounds mentioned above individually into acetyl acetone, 1,1,1-trifluoroacetylacetone or 1,1,1,5,5,5-hexafluoroacetylacetone.

No specific limitation is placed on a fabrication method for a polarizer of the invention and fine metallic particles are dispersed into a solution containing a matrix material to thereby prepare a mixed solution. A mixing ratio of a solution of an organic matrix material and a solution in which fine metallic particles are dispersed (or a solution containing a metallic dopant) is adjusted properly so that a content of fine metallic particles dispersed in the matrix in the obtained polarizer falls within the above-mentioned range. Note that the following various kinds of additives can be added into the solution: a dispersant, a surfactant, a hue adjuster, an ultraviolet absorbent, a flame retardant, an antioxydant, a thickner, a plasticizer and others.

In a case where an organic matrix material is a translucent polymer, a film is formed with the mixed solution and thereafter, a polarizer is obtained by uniaxially stretching.

No specific limitation is placed on a solvent used in a translucent polymer solution as far as the solvent dissolves a translucent polymer. Examples thereof include: water; aromatic hydrocarbons such as toluene and xylene; ketones such as acetone, methyl ethyl ketone, methyl isobutyl ketone, cyclohexanone, cyclopetanone, cycloheptanone, 2-heptanone, methyl isobutyl ketone and butyl lactone; alcohols such as methanol, ethanol, n-propyl alcohol, iso-propyl alcohol, n-butyl alcohol, iso-butyl alcohol and tert-butyl alcohol; esters such as methyl acetate, ethyl acetate, propyl acetate, methyl propionate and ethyl propionate; hydrocarbons such as hexane and cyclohexane; hydrocarbon halides such as dichloromethane, chloroform, carbon tetrachloride, dichloroethane, trichloroethane, tetrachloroethane and trichloroethylene; and ethers such as tetrahydrofuran. Note that in a case where a water-soluble polymer such as polyvinyl alcohol is adopted as a translucent polymer, water is preferably used as a solvent.

A concentration of a translucent polymer solution is usually preferably about 5 to 50 wt % and more preferably about 0.05 to 30 wt %. On the other hand, fine metallic particles are usually mixed into the translucent polymer solution, as a dispersion solution. A concentration of fine metallic particles in a dispersion solution is preferably adjusted to about 0.1 to 15 wt % and more preferably about 0.1 to 10 wt %.

A film is formed with a mixed solution obtained by dispersing fine metallic particles into the translucent polymer solution. Methods for forming a film that can be adopted include: various kinds of methods such as a casting method, an extrusion molding method, a laminate molding method, an injection molding method, a roll molding method and a flow molding method. By adjusting a viscosity of a solution and a drying speed in film formation, sizes of domains and dispersibility can also be controlled.

Then, by uniaxial stretching, a uniaxial birefringence is imparted to a translucent polymer with which a polymer matrix is formed. Since a wavelength region having a polarization characteristic therein is determined by a plasmon absorption wavelength of fine metallic particles and characteristics such as a refractive index of a translucent polymer, an optical characteristic of a polarizer can be controlled by controlling a birefringence of the translucent polymer with a uniaxial stretch treatment.

A uniaxial stretch treatment may be either dry stretching such as stretching in air or contact with a metal roll, or wet stretching in water in a case where a translucent polymer is a water-soluble polymer such as polyvinyl alcohol. Note that stretching is performed at a temperature in the vicinity of the glass transition temperature of a translucent polymer at which extension is possible according to a kind of a translucent polymer. No specific limitation is imposed on a stretch ratio and a stretch ratio is preferably about 1.05 to 30, more preferably about 3 to 30 and still more preferably about 5 to 20. A stretch ratio is more preferably about 1.05 to 8 and further preferably about 3 to 8.

In a case where a liquid crystalline material is adopted as a matrix material, for example, the mixed solution is prepared and the mixed solution is caused to be uniaxially aligned and a film is formed with the mixed solution to obtain a polarizer.

Examples of solvents used in preparation of a solution of a liquid crystalline material include: hydrocarbon halides such as chloroform, dichloromethane, dichloroethane, tetrachloroethane, trichloroethylene, tetrachloroethylene and chlorobenzene; phenols such as phenol and p-chlorophenol; aromatic hydrocarbons such as benzene, toluene, xylene, methoxybenzene and 1,2-dimethoxybenzene; in addition, acetone, ethyl acetate, tert-butyl alcohol, glycerin, ethylene glycol, triethylene glycol, ethylene glycol monomethyl ether, diethylene glycol dimethyl ether, ethyl cellosolve, butyl cellosolve, 2-pyrrolidone, N-methyl-2-pirrolidone, piridine, triethylamine, tetrahydrofuran, dimethylformaldehyde, dimethylacetoamide, dimethyl sulfoxide, acetonitrile, butylonitrile, carbon disulfide, cyclohexanone and others. A concentration of a liquid crystalline material solution is preferably adjusted to about 5 to 50 wt % and more preferably about 0.05 to 30 wt %. On the other hand, fine metallic particles are usually mixed into the liquid crystalline material solution as a dispersion medium solution. A concentration of fine metallic particles in a dispersion solution thereof is preferably adjusted to about 0.1 to 10 wt % and more preferably about 0.01 to 5 wt %.

A film is formed using a mixed solution obtained by dispersing fine metallic particles into a solution of the liquid crystalline material. The liquid crystalline material is uniaxially aligned. Alignment of the liquid crystalline material can be implemented by forming a film on an alignment substrate. As an alignment substrate, there can be used various kinds of substrates that have been conventionally known and examples thereof that can be used include: an alignment substrate prepared with a method in which a alignment film made from polyimide or polyvinyl alcohol is formed on the substrate as a thin layer, followed by rubbing; a stretched film obtained by stretching a substrate; and an alignment film prepared by irradiating a polymer having a cinnamate skeleton or an azobenzene skeleton or a polyimide with polarized ultraviolet.

Examples of methods for coating the mixed solution on the alignment substrate that can be adopted include: a roll coating method, a gravure coating method, a spin coating method, a bar coating method and others. After coating, a solvent is removed to form a film. In film formation, sizes of domains and dispersibility thereof can also be controlled by adjusting a viscosity of the solution and a drying speed. No specific limitation is placed on conditions for solvent removal and any set of conditions may be applied as far as almost all the solvent can be removed and no part of a film moves like a liquid or flows down. Removal of a solvent generally uses a drying at room temperature, drying in a drying furnace, heating on a hot plate and others.

Alignment of a liquid crystalline material can be achieved by a heat treatment at a temperature at which a liquid crystalline material assumes a liquid crystal state. The heat treatment temperature is properly adjusted so as to be adapted for a liquid crystalline material. As a heat treatment method, there can be adopted a method similar to the drying method. Alignment of a liquid crystalline material can be implemented by alignment under an influence of an electric field, a magnetic field, a stress or the like in addition to use of an alignment substrate.

In a case where a liquid crystal monomer is adopted as a liquid crystalline material, the liquid crystalline material is polymerized after the alignment. A polymerization initiator is properly mixed into a liquid crystal monomer. As a polymerization method, various kinds of means according to a kind of the liquid crystal monomer and for example, an optical polymerization with irradiation of light can be adopted. Light irradiation is realized with ultraviolet irradiation. As conditions for ultraviolet irradiation, the irradiation in an inert gas is preferably adopted in order to promote a reaction sufficiently. A high pressure mercury ultraviolet lamp is typically adopted. Different kinds of lamps can also be used: for example, a metal halide UV lamp and an incandescent lamp.

No specific limitation is placed on a thickness of a polarizer and the thickness is usually about 0.1 to 100 μm and preferably 5 to 80 μm.

The above-described polarizer may be used as a polarizing plate with a transparent protective layer prepared at least on one side thereof using a usual method. The transparent protective layer may be prepared as an application layer by polymers, or a laminated layer of films. Proper transparent materials may be used as a transparent polymer or a film material that forms the transparent protective layer, and the material having outstanding transparency, mechanical strength, heat stability and outstanding moisture interception property, etc. may be preferably used. As materials of the above-mentioned protective layer, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Films made of heat curing type or ultraviolet ray curing type resins, such as acryl based, urethane based, acryl urethane based, epoxy based, and silicone based, etc. may be mentioned.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

As a transparent protection film, if polarization property and durability are taken into consideration, cellulose based polymer, such as triacetyl cellulose, is preferable, and especially triacetyl cellulose film is suitable. In general, a thickness of a transparent protection film is 500 μm or less, preferably 1 through 300 μm, and especially preferably 5 through 300 μm. In addition, when transparent protection films are provided on both sides of the polarizer, transparent protection films comprising same polymer material may be used on both of a front side and a back side, and transparent protection films comprising different polymer materials etc. may be used.

Moreover, it is preferable that the transparent protection film may have as little coloring as possible. Accordingly, a protection film having a phase difference value in a film thickness direction represented by $Rth=[(nx+ny)/2-nz] \times d$ of −90 nm through +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protection film may mostly be cancelled using a protection film having a phase difference value (Rth) of −90 nm through +75 nm in a thickness direction. The phase difference value (Rth) in a thickness direction is preferably −80 nm through +60 nm, and especially preferably −70 nm through +45 nm.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 µm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

Adhesives are used for adhesion processing of the above described polarizing film and the transparent protective film. As adhesives, isocyanate derived adhesives, polyvinyl alcohol derived adhesives, gelatin derived adhesives, vinyl polymers derived latex type, aqueous polyesters derived adhesives, etc. may be mentioned. The above-described adhesives are usually used as adhesives comprising aqueous solution, and usually contain solid of 0.5 to 60% by weight.

A polarizing plate of the present invention is manufactured by adhering the above described transparent protective film and the polarizing film using the above described adhesives. The application of adhesives may be performed to any of the transparent protective film or the polarizing film, and may be performed to both of them. After adhered, drying process is given and the adhesion layer comprising applied dry layer is formed. Adhering process of the polarizing film and the transparent protective film may be performed using a roll laminator etc. Although a thickness of the adhesion layer is not especially limited, it is usually approximately 0.1 to 5 µm.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflector, a transreflective plate, a retardation plate (a half wavelength plate and a quarter wavelength plate included), and a viewing angle compensation film, may be used. Especially preferable polarizing plates are; a reflection type polarizing plate or a transreflective type polarizing plate in which a reflector or a transreflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transreflective type polarizing plate may be obtained by preparing the above-mentioned reflective layer as a transreflective type reflective layer, such as a half-mirror etc. that reflects and transmits light. A transreflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transreflective type polarizing plate. That is, the transreflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystalline materials, such as liquid crystal polymer; and films on which an alignment layer of a liquid crystalline material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal bidirectional stretching and a biaxially stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transreflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which an adhesive layer is once formed on a separator, as mentioned above, and is then transferred on a polarizing plate or an optical film may be mentioned.

An adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflector is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, an organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Description will be given of the invention in a more detailed way describing examples and it should be understood that the invention is not limited to any of the examples.

Example 1

Gradually dissolved into water while heated and stirred were 100 parts by weight of polyvinyl alcohol having a polymerization degree of 2400 (with a transmittance of 88% measured on a sample having a thickness of 1 mm) and 10 parts by weight of glycerin to thereby obtain a 10 wt % polyvinyl alcohol aqueous solution. Mixed into 10 parts by weight of the obtained polyvinyl alcohol aqueous solution was 4 parts by weight of a 1 wt % aqueous dispersion of ultrafine silver particles (an average particle diameter of 20 nm) and the mixture was sufficiently stirred to prepare a mixed solution. Then, the mixed solution was extended on a flat plate on which a mold release treatment had been applied in advance with an applicator to a thickness after drying of 75 μm and was dried at 50° C. for 1 hour to obtain a polyvinyl alcohol film in which ultrafine silver particles were dispersed. The obtained polyvinyl alcohol film was uniaxially stretched at a stretch ratio of 3 while being brought into contact with a metal roll heated at 100° C. to thereby obtain a polarizer having a thickness of 30 μm. A transmittance of the film after stretching was 88%. The stretched film was in light yellow due to absorption by ultrafine silver particles and exhibited a dichroic performance.

An average particle diameter and an aspect ratio of domains formed with fine metallic particles were measured on the obtained polarizer. An average particle diameter and an aspect ratio were measured with TEM. The average particle diameter was 25 nm and the aspect ratio was 1.3. An absorption characteristic of the obtained polarizer was measured with the result that increase in absorption was confirmed in the vicinity of 400 nm. Note that measurement of an absorption characteristic was performed with U-4100 manufactured by Hitachi, Ltd.

(Physical Property of Polarizer)

A birefringence itself of a film made from a polyvinyl alcohol, which was a matrix material of a polarizer, was unable to be measured, but for a film stretched in the same condition as the above except for adding no fine silver particles a retardation (Δn·d) and d (Δn: birefringence, d: film thickness) were firstly measured with an automatic birefringence analyzer KOBRA-21ADH, manufactured by Oji Scientific Instruments and thereafter, Δn was secondly obtained to be 0.03.

(Absorption Spectrum of Polarizer)

Figure 1:
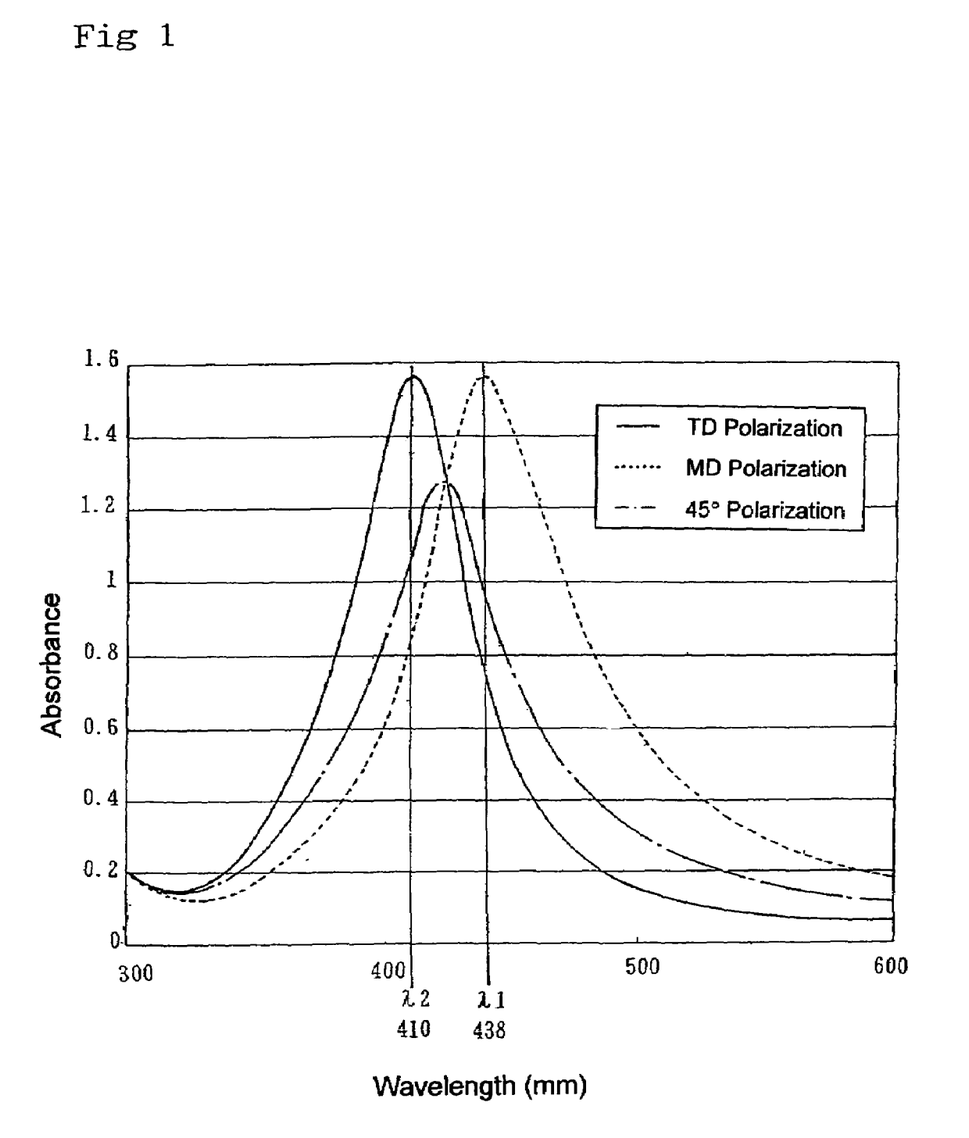
FIG. 1 shows absorption spectra measured while altering an azimuth of an incident polarization plane, in a polarizer of Example 1.

Absorption spectra in a case where polarized light enters on the obtained polarizer were measured. Absorption spectra are shown in FIG. 1. Measurement of an absorption spectrum was performed with a spectrophotometer U4100 manufactured by Hitachi, Ltd. with installment of a Glan-Thomspn polarization prism. In a case where the incident polarization plane was, as shown in FIG. 1, in parallel to the stretch direction (MD polarized light), the absorption peak wavelength was at the longest wavelength (λ1: 438 nm), while the peak wavelength shifted to the short wavelength side (for example, 45 degrees polarized light) as an azimuth of the incident polarization plane rotated and the absorption peak took the shortest wavelength (λ2: 410 nm) in polarized light (TD polarized light) in a direction perpendicular to the stretch direction. The polarizer eventually produced polarized light and (λ1−2)=28 nm was obtained.

Example 2

A polarizer was obtained in a similar way to that in Example 1 with the exception that in Example 1, fine silver particles were replaced with fine gold particles to thereby obtain a polarizer. Transmittance of a stretched film was 88%. The stretched film was in light red color due to absorption by ultrafine gold particles and exhibits a dichroic performance. An average particle diameter of domains formed with fine metallic particles in the obtained polarizer was 25 nm and an aspect ratio thereof was 1.2.

Comparative Example 1

Used was an iodine-based polarizer sold on the market having a transmittance of 43% and a polarization degree of 99.95% after two view field XYZ correction according to JIS Z 8701, wherein a polyvinyl alcohol film having a transmittance of 88% was used as the matrix material.

Comparative Example 2

A film obtained by dispersing fine silver particles in polyimide having a transmittance 68% at the same content as in Example 1 was stretched at a stretch ratio of 1.1 to obtain a polarizer. The stretched film was in deep yellow color due to coloration of polyimide and absorption by ultrafine silver particles and exhibits a dichroic performance.

The following evaluations were performed on the polarizers of Examples 1 to 2 and Comparative Examples 1 to 2. The results of the evaluations are shown in Table 1.

(Transmittance)

A transmittance of a polymer matrix was a total transmittance (%) for a wavelength of 550 nm measured with U-4100 manufactured by Hitachi, Ltd.

(Heat Resistance)

A polarizer was left as it is in an environment at 100° C. for 24 hours to dry and thereafter, the polarizer was visually observed to evaluate using the following criteria.

O: decoloration and alteration in color are not observed visually.

x: decoloration and alteration in color can be observed visually.

TABLE 1

|  | Transmittance of polymer matrix (%) | Heat resistance |
|---|---|---|
| Example 1 | 88 | o |
| Example 2 | 88 | o |
| Comparative Example 1 | 88 | x |
| Comparative Example 2 | 68 | o |

Example 3

Dissolved into a toluene was 100 parts by weight of a liquid crystal monomer having one acryloyl group in a molecule (forming a nematic liquid crystal phase at a temperature of 90 to 190° C.) and added into the solution were 5 parts by weight of a photopolymerization initiator (IRGACURE 907 manufactured by Ciba Specialty Chemicals) and 0.5 parts by weight of a leveling agent (BYK-361) to prepare a solution of a liquid crystal monomer having a concentration of 20 wt %. Mixed into the solution was 1 part by weight of about 1 wt % dispersion liquid of ultrafine silver particles obtained by dispersing the ultrafine silver particles (an average particle diameter of 10 nm) into toluene and the mixture was sufficiently stirred to prepare a mixed solution containing ultrafine silver particles at a concentration of about 1%.

The mixed solution was coated on an alignment film obtained by rubbing treated a thin layer made from polyvinyl alcohol formed on a glass substrate by spin coating and was dried at 110° C. for 3 min. And irradiation was performed with UV for UV polymerization to thereby obtain a polarizer having a thickness of 2 μm.

An aspect ratio of a domain formed with fine metallic particles was measured on the obtained polarizer. An average particle diameter and an aspect ratio were measured with TEM. The aspect ratio was 1.3. An absorption characteristic was measured of the obtained polarizer with the result that increase in absorption at 420 nm was confirmed. Note that measurement of an absorption characteristic was performed with U-4100 manufactured by Hitachi, Ltd.

Example 4

A liquid crystal polymer of a side chain type having a cyanobiphenyl group (forming a nematic phase at 70 to 190° C.) was dissolved into toluene to thereby prepare a solution at a concentration of 20 wt %. Mixed into the solution was 1 part by weight of a 20 wt % dispersion liquid of ultrafine silver particles (an average particle diameter of 10 nm) obtained by dispersing the ultrafine silver particles into toluene and the mixture was sufficiently stirred to prepare a mixed solution having ultrafine particles at a concentration of about 1%.

The mixed solution was coated, by spin coating, on an alignment film obtained by rubbing treating a thin layer of a polyvinyl alcohol formed on a glass substrate and was dried at 110° C. for 3 min to thereby obtain a polarizer having a thickness of 2 μm.

An aspect ratio of a domain formed with fine metallic particles was measured on each of the obtained polarizers. An average particle diameter and an aspect ratio were measured with TEM. The aspect ratio was 1.3. An absorption characteristic was measured of the obtained polarizers with the result that increases in absorption were confirmed in the vicinities of 420 nm and 550 nm.

Evaluation of heat resistance was performed on the polarizers of Examples 3 to 4 in the same manner as the above procedure. The results of the evaluation are shown in Table 2.

TABLE 2

|  | Heat resistance |
| --- | --- |
| Example 3 | ◯ |
| Example 4 | ◯ |

INDUSTRIAL APPLICABILITY

The invention is useful as a polarizer and a polarizing plate and an optical film using the polarizer or polarizers can be preferably applied to image displays such as a liquid crystal display, an organic EL display, CRT and PDP.

The invention claimed is:

1. A polarizer composed of a film comprising a structure in which fine metallic particles is dispersed in a polymer matrix, wherein a polymer forming the polymer matrix is a translucent polymer having a light transmittance of 88% or more when measured thereof with a thickness of 1 mm and the film is uniaxially stretched,
a domain formed with fine metallic particles has an average particle diameter of 100 nm or less and an aspect ratio (a ratio of a maximum length/a minimum length) of less than 1.5,
wherein the fine metallic particles are gold fine particles or silver fine particles and the translucent polymer has uniaxial birefringence due to uniaxial stretching; and
the polarizer has an absorption spectrum with an absorption peak at a given wavelength, measured when polarized light incidences thereon,
wherein if an azimuth of an incident polarization plane is altered relative to the polarizer, the absorption peak wavelength shifts in accordance with an alteration in the azimuth, in a case where an azimuth of the incident polarization plane relative to the polarizer is altered, if an azimuth of the incident polarization plane is 0 degree when an absorption peak wavelength of an absorption spectrum that is measured is the longest wavelength, which is referred to as λ1, by definition,
if an azimuth of the polarization plane is gradually increased from 0 degree, a value of the absorption peak wavelength shifts to the short wavelength side in accordance with the increase,
when an azimuth of the incident polarization plane is 90 degrees, a value of the absorption peak wavelength is the shortest wavelength, which is referred to as λ2, by definition, and satisfying a relation of (λ1−λ2)=10 to 50 nm.

2. A fabrication method for the polarizer according to claim 1, comprising steps of: forming a film with a mixed solution comprising fine metallic particles obtained by dispersing fine metallic particles in a solution containing a translucent polymer having a light transmittance of 88% or more when measured thereof with a thickness of 1 mm and thereafter, uniaxially stretching the film.

3. A polarizing plate in which a transparent protective layer is provided on at least one surface of the polarizer according to claim 1.

4. An optical film comprising the polarizing plate according to claim 3 as a laminate.

5. An image display comprising the polarizing plate according to claim 3.

6. An optical film comprising one polarizer according to claim 1.

7. An image display comprising the optical film according to claim 6.

8. An image display comprising one polarizer according to claim 1.

9. The polarizer according to claim 1, wherein a content of fine metallic particles dispersed in the matrix is 0.1 to 10 parts by weight relative to 100 parts by weight of the matrix materials.

10. The polarizer according to claim 1, wherein said fine metallic particles are not aligned within the polymer matrix.

11. The polarizer according to claim 1, wherein the average particle diameter is 25 nm and the aspect ratio is 1.3.

12. The polarizer according to claim 1, wherein the film has a stretch ratio of 3 to 30 times.

13. A polarizer in which fine metallic particles is dispersed in a matrix formed with a liquid crystalline material, wherein a domain formed with fine metallic particles has an average particle diameter of 100 nm or less and an aspect ratio (a ratio of a maximum length/a minimum length) of or less than 1.5, wherein the fine metallic particles are gold fine particles or silver fine particles; and
the polarizer has an absorption spectrum with an absorption peak at a given wavelength, measured when polarized light incidences thereon, wherein if an azimuth of an incident polarization plane is altered relative to the polarizer, the absorption peak wavelength shifts in accordance with an alteration in the azimuth, in a case where an azimuth of the incident polarization plane relative to the polarizer is altered, if an azimuth of the incident polarization plane is 0 degree when an absorption peak wavelength of an absorption spectrum that is measured is the longest wavelength, which is referred to as λ1, by definition, if an azimuth of the polarization plane is gradually increased from 0 degree, a value of the absorption peak wavelength shifts to the short wavelength side in accordance with the increase, when an azimuth of the incident polarization plane is 90 degrees, a value of the absorption peak wavelength is the shortest wavelength, which is referred to as λ2, by definition, and satisfying a relation of(λ1−λ2)=10 to 50 nm.

14. The polarizer according to claim 13, wherein the liquid crystalline material is uniaxially aligned.

15. The polarizer according to claim 13, wherein the liquid crystalline material is a liquid crystal polymer.

16. The fabrication method for the polarizer according to claim 13, comprising step of: forming a film with a mixed solution obtained by dispersing fine metallic particles in a solution containing a liquid crystalline material.

17. The polarizer according to claim 13, wherein a content of fine metallic particles dispersed in the matrix is 0.1 to 10 parts by weight relative to 100 parts by weight of the matrix materials.

18. The polarizer according to claim 13, wherein said fine metallic particles are not aligned within the liquid crystalline material matrix.

19. A polarizer composed of a film in which fine metallic particles is dispersed in a translucent polymer having a birefringence in the film plane, wherein a domain formed with fine metallic particles has an average particle diameter of 100 nm or less and an aspect ratio (a ratio of a maximum length/a minimum length) of less than 1.5, the polarizer has an absorption spectrum with an absorption peak at a given wavelength, measured when polarized light incidences thereon, wherein if an azimuth of an incident polarization plane is altered relative to the polarizer, the absorption peak wavelength shifts in accordance with an alteration in the azimuth, and wherein the fine metallic particles are gold fine particles or silver fine particles and the translucent polymer has uniaxial birefringence due to uniaxial stretching in a case where an azimuth of the incident polarization plane relative to the polarizer is altered, if an azimuth of the incident polarization plane is 0 degree when an absorption peak wavelength of an absorption spectrum that is measured is the longest wavelength, which is referred to as λ1, by definition, if an azimuth of the polarization plane is gradually increased from 0 degree, a value of the absorption peak wavelength shifts to the short wavelength side in accordance with the increase when an azimuth of the incident polarization plane is 90 degrees, a value of the absorption peak wavelength is the shortest wavelength, which is referred to as λ2, by definition, and satisfying a relation of(λ1−λ2)=10 to 50 nm.

20. The polarizer according to claim 19, wherein a content of fine metallic particles dispersed in the matrix is 0.1 to 10 parts by weight relative to 100 parts by weight of the matrix materials.

21. The polarizer according to claim 19, wherein said fine metallic particles are not aligned with the polymer matrix.

22. The polarizer according to claim 19, wherein the film has a stretch ratio of 3 to 30 times.

* * * * *

UNITED STATES PATENT AND TRADEMARK OFFICE
CERTIFICATE OF CORRECTION

| | |
|---|---|
| PATENT NO. | : 7,622,167 B2 |
| APPLICATION NO. | : 10/532059 |
| DATED | : November 24, 2009 |
| INVENTOR(S) | : Hirai et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 536 days.

Signed and Sealed this

Fourteenth Day of December, 2010

David J. Kappos
*Director of the United States Patent and Trademark Office*